United States Patent
de Cerqueira Gatti et al.

(10) Patent No.: US 8,515,999 B2
(45) Date of Patent: Aug. 20, 2013

(54) METHOD AND SYSTEM PROVIDING DOCUMENT SEMANTIC VALIDATION AND REPORTING OF SCHEMA VIOLATIONS

(75) Inventors: Maira Athanazio de Cerqueira Gatti, Rio de Janeiro (BR); Ricardo Guimaraes Herrmann, Consolacao (BR); David Matthew Loewenstern, New York, NY (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 13/248,347

(22) Filed: Sep. 29, 2011

(65) Prior Publication Data
US 2013/0086100 A1    Apr. 4, 2013

(51) Int. Cl.
*G06F 17/30*    (2006.01)
(52) U.S. Cl.
USPC ............ 707/791; 707/802; 707/822; 707/828
(58) Field of Classification Search
USPC ................................................. 707/600–899
See application file for complete search history.

(56) References Cited

U.S. PATENT DOCUMENTS

| | | |
|---|---|---|
| 7,701,510 B2 | 4/2010 | Lewis |
| 2004/0046804 A1 | 3/2004 | Chang |
| 2006/0288270 A1 | 12/2006 | Gaurav et al. |
| 2008/0104511 A1 | 5/2008 | Chinnadurai et al. |
| 2009/0059909 A1* | 3/2009 | Sullivan ........................ 370/360 |

OTHER PUBLICATIONS http://www.json.org/, Introducing JSON (5 pages).
D. Crockford, The application/json Media Type for JavaScript Object Notation (JSON), Network Working Group, Request for Comments: 4627, Category: Informational, Jul. 2006.
http://www.w3.org/XML/Schema.html, W3C Ubiquitous Web domain, XML Schema.
K. Zyp, A JSON Media Type for Describing the Structure and Meaning of JSON Documents, draft-zyp-json-schema-03; Intenet Engineering Task Force, Internet-Draft, Intended Status: Informational, Nov. 22, 2010.
http://json-schema.org/.
http://davidwalsh.name/json-validation, JSON Validation with JSON Schema.
http://jsonlint.com/, The JSON Validator.
http://www.schematron.com/, A language for Making Assertions about Patterns Found in XML Documents.
https://www.p6r.com/, Cross-Platform Solutions.
https://www.p6r.com/articles/2008/05/06/xslt-and-xpath-for-json/, XSLT and XPath for JSON; May 6, 2008.
https://www.p6r.com/software.html.
Standard ECMA-262 3rd Edition—Dec. 1999, ECMAScript 3.1 Language Specification—Draft, ECMA Standardizing Information and Communciation Systems.

* cited by examiner

*Primary Examiner* — Isaac M Woo
(74) *Attorney, Agent, or Firm* — Harrington & Smith; Louis J. Percello

(57) ABSTRACT

A method includes receiving a request from a requestor to validate a data assemblage expressed in Javascript Object Notation (JSON); translating the data assemblage expressed in JSON into an extensible markup language (XML) instance; validating the XML instance using syntactic schema and semantic schema specifications; and sending a response to the requestor. For a case where the data assemblage contains invalid data in at least one field the response includes an output array containing information for specifying valid data for the at least one field and a message explaining a reason why the field is invalid. A system for performing the method is also described, as is a computer program product that can be used to execute the method.

24 Claims, 7 Drawing Sheets

METHOD AND SYSTEM PROVIDING DOCUMENT SEMANTIC VALIDATION AND REPORTING OF SCHEMA VIOLATIONS

TECHNICAL FIELD

The exemplary embodiments of this invention relate generally to methods, systems and computer program products configured for providing semantic validation of data, such as Javascript Object Notation (JSON) documents, objects and arrays, and for reporting schema violations.

BACKGROUND

JSON is an open, text-based data exchange format. Reference can be made, for example, to RFC 4627. "The application/json Media Type for Javascript Object Notation (JSON), D. Crockford, JSON.org, July 2006.

JSON is a lightweight data-interchange format. JSON is easy for humans to read and write and for machines to parse and generate. It is based on a subset of the JavaScript Programming Language, Standard ECMA-262 3rd Edition—December 1999. JSON is a text format that is completely language independent but uses conventions that are familiar to programmers of the C-family of languages, including C, C++, C#, Java, JavaScript, Perl, Python, and many others. These properties make JSON an attractive data-interchange language.

JSON is built on two structures:
(A) A collection of name/value pairs. In various languages, this is realized as an object, record, struct, dictionary, hash table, keyed list, or associative array.
(B) An ordered list of values. In most languages, this is realized as an array, vector, list, or sequence.

These are universal data structures that are supported by many modern programming languages.

The Schematron (Schematron.com) differs from other schema languages in that it not based on grammars but instead on finding tree patterns in a parsed document. This approach is said to allow many kinds of structures to be represented which are inconvenient and difficult in grammar-based schema languages. The Schematron is said to allow the development and mixing two kinds of schemas: (a) report elements that allow diagnosing which variant of a language is being processed, and (b) assert elements that allow confirmation that a document conforms to a particular schema.

The Schematron is based on certain actions:
first, find context nodes in the document (typically an element) based on XPath path criteria; and then, check to determine if some other XPath expressions are true, for each of the found context nodes.

Schematron is an example of a rule-based language that allows the specification of semantic constraints. Schematron is based on the tree pattern (XPath).

Extensible markup language (XML) schemas express shared vocabularies and enable machines to carry out human-defined rules. XML schemas provide a means for defining the structure, content and semantics of XML documents.

In a general sense an XML schema is a description of a type of XML document, typically expressed in terms of constraints on the structure and content of documents of that type, above and beyond the basic syntactical constraints imposed by XML itself. These constraints are generally expressed using some combination of grammatical rules governing the order of elements, Boolean predicates that the content must satisfy, data types governing the content of elements and attributes, and more specialized rules such as uniqueness and referential integrity constraints.

Languages have been developed specifically to express XML schemas. The Document Type Definition (DTD) language, which is native to the XML specification, is one such type of language. Two more expressive XML schema languages are XML Schema (XSD) and RELAX.

The mechanism for associating an XML document with a schema varies according to the schema language. The association may be achieved via markup within the XML document itself, or via some external means.

An XML Path Language (XPath) expression uses a path notation, similar to those used in URLs, for addressing parts of an XML document. The expression is evaluated to yield an object of the node-set, Boolean, number, or string type. For example, the expression X/Y will return a node-set of the <Y> elements contained in the <X> elements, if such elements are declared in the source XML document.

Currently available languages for expressing XML schemas are deficient in certain respects, such as in providing an ability to employ a combination of syntactic and semantic constraints.

SUMMARY

In one aspect thereof the exemplary embodiments provide a method to process data. The method comprises receiving a request from a requestor to validate a data assemblage expressed in Javascript Object Notation (JSON); translating the data assemblage expressed in JSON into an extensible markup language (XML) instance; validating the XML instance using syntactic schema and semantic schema specifications; and sending a response to the requestor. For a case where the data assemblage contains invalid data in at least one field the response is comprised of an output array comprising information for specifying valid data for the at least one field and a message explaining a reason why the field is invalid.

In another aspect thereof the exemplary embodiments provide a computer-readable medium that contains computer program instructions, where the execution of the computer program instructions by at least one data processor results in performance of operations that comprise receiving a request from a requestor to validate a data assemblage expressed in Javascript Object Notation (JSON); translating the data assemblage expressed in JSON into an extensible markup language (XML) instance; validating the XML instance using syntactic schema and semantic schema specifications; and sending a response to the requestor, where for a case where the data assemblage contains invalid data in at least one field the response is comprised of an output array comprising information for specifying valid data for the at least one field and a message explaining a reason why the field is invalid.

In yet another aspect thereof the exemplary embodiments provide a data processing system that comprises at least one data processor connected with at least one memory that stores computer program instructions and at least one interface connected with the at least one data processor and configured for conducting bidirectional communications via at least one network. The at least one data processor operates under control of the computer program instructions to receive a request via the interface from a requestor to validate a data assemblage expressed in Javascript Object Notation (JSON); to translate the data assemblage expressed in JSON into an extensible markup language (XML) instance; to validate the XML instance using syntactic schema and semantic schema specifications; and to send a response to the requestor via the interface. For a case where the data assemblage contains invalid data in at least one field the response is comprised of an output array comprising information for specifying valid data for the at least one field and a message explaining a reason why the field is invalid.

DETAILED DESCRIPTION

The embodiments of this invention provide in one aspect thereof a method for validating and reporting schema violations of JSON documents, objects, or arrays.

The embodiments of this invention enable both syntactic and semantic validation of a JSON document, object, or array with the use of schemas and a Facts XML document, and reporting of the detected violations by merging the retrieved valid data results for each invalid field.

Note that the specifics of a data assemblage that represents a JSON document, object, or array depends on the specifics of the JSON parser implementation, as well on the programming language that is used.

It is pointed out that while the embodiments of this invention will be described in the context of JSON and XML documents, the embodiments of this invention are applicable to any tree-structure-based document such as, but not limited to, HTML and any SGML-based document.

Figure 1:
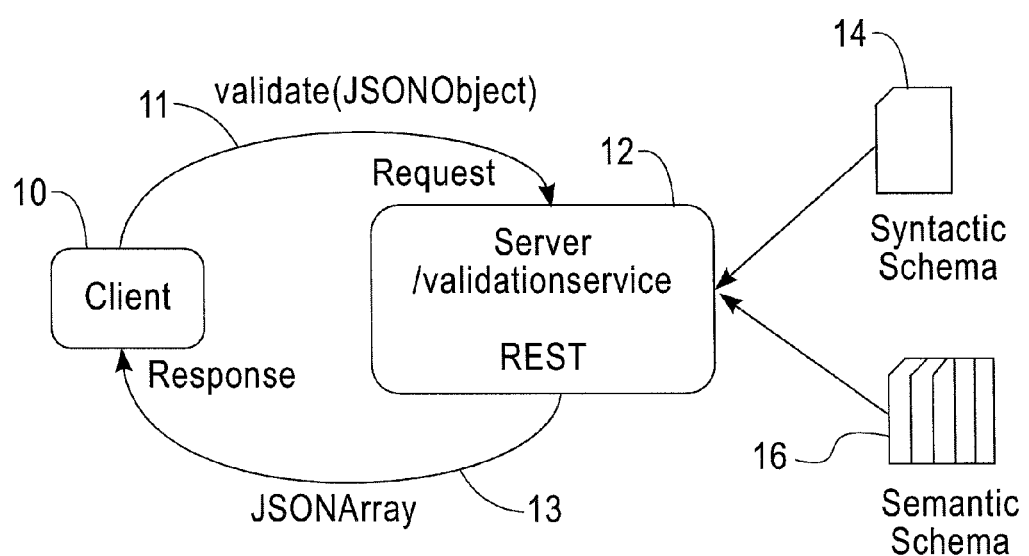
FIG. 1 shows a high level view of a JSON Validation Service interface.

Reference is made to FIG. 1 for showing a high level view of a JSON validation service interface. FIG. 1 illustrates a request 11 from a Client application 10 to a Validation Service 12 implemented by at least one server. The request 11 is to validate a particular JSON object (validate(JSONObject)). The JSON(Object) can be referred to herein generally as a data assemblage and can comprise a JSON document, a JSON object, or a JSON array, as non-limiting examples of the form the data assemblage can take. The Validation Service 12 could be developed at least on part as a REST WebService implementing a Validation Service interface.

First, the Client application 10 sends a JSON document, for example as a JSONObject, to the Validation Service 12. As was noted above, the specifics of the data assemblage that represents a JSON document, object, or array depends on the specifics of the JSON parser implementation, as well on the programming language that is used. The Validation Service 12 translates the input JSON(Object) into an extensible markup language (XML) document and uses syntactic schema 14 and semantic schema 16 specifications in order to validate the corresponding XML document. As non-limiting examples the syntactic schema 14 can be specified using XSD and the semantic schema 16 can be specified using Schematron.

The output 13 of the Validation Service 12 is a JSONArray. The JSONArray may be null if the input JSONObject is determined to be valid. However, if any field in the JSONObject is invalid the JSONArray reports schema violations regarding each invalid field. The output 13 (the JSONArray) contains complete information for the legal (valid) data for each field and natural language messages explaining the reason the field is invalid.

Figure 2:
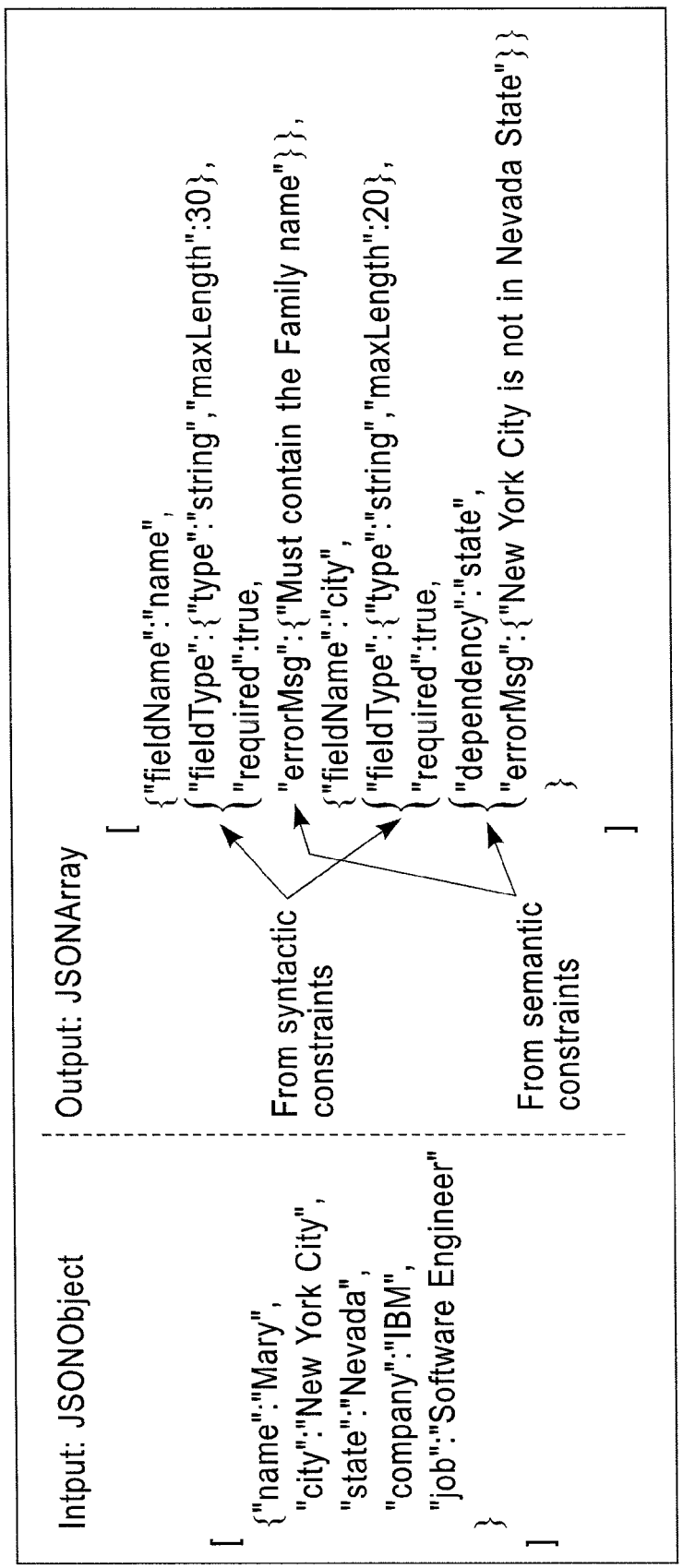
FIG. 2 illustrates a non-limiting example of an input JSONObject containing five fields: name, city, state, company and job, and their corresponding values to be validated.

FIG. 2 illustrates an example of an input JSONObject 11 which contains five fields: name, city, state, company and job, and their corresponding values to be validated. An example of the JSONArray output 13 is also presented. In this example there are two invalid fields: name and city. Their type information is derived from the syntactic constrains specified in the XSD Schema and the dependencies information and error messages are derived from the semantic constraints specified in the Schematron Schema. In this case the entered name (Mary) is flagged as not being a family name, and the entered city (New York City) is flagged as not being a city in the state of Nevada.

Figure 3:
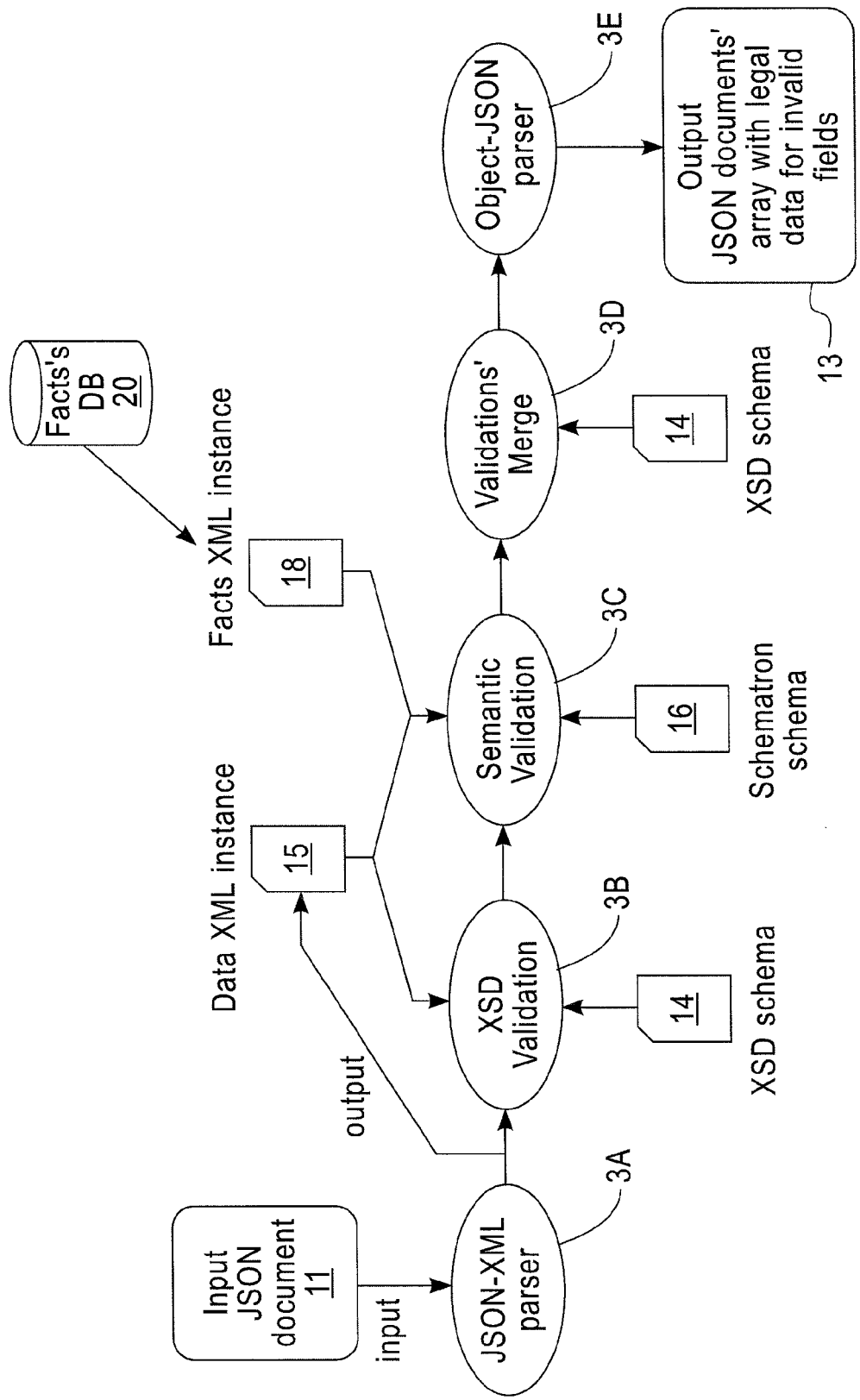
FIG. 3 illustrates a method workflow and client application interaction of the Validation Service shown in FIG. 1.

FIG. 3 describes the method workflow and client application interaction of the Validation Service 12 of FIG. 1. In this exemplary workflow the Validation Service 12:

3A. Parses the JSONObject input into an XML document (data XML instance 15);

3B. Validates the XML document against the XSD schema (the syntactic schema 14 of FIG. 1) and retains the result of validation;

3C. Validates the XML document against the Schematron schema (the semantic 16 schema of FIG. 1) which contains rules that include the semantic constrains loaded from a Facts XML instance 18 derived from a Facts database (DB) 20 and retains the result of validation;

3D. Merges the output results from the XSD (syntactic) and Semantic validation into an array structure; and 3E. Parses the array structure to a JSON document and returns JSONArray 13 to the client 10 (FIG. 2 illustrates an example of the content of the JSONArray 13).

The semantic validation assumes that there is at least one XML document (Facts XML instance 18) that contains the facts of which the rule engine 3C (that as mentioned can be implemented with Schematron) can use to infer if there are inter-dependencies. As an example of inter-dependencies specified in the Facts XML document 18 (which is tree-pattern-based), assume the example of the input JSON document illustrated in FIG. 2 where city values depend on state values as in the following:

```
<State value="New York">
  <Cities>
    <City>Albany</City>
    <City>Binghamton</City>
    <City>New York City</City>
  </Cities>
</State>
<State value="Nevada">
  <Cities>
    <City>Boulder City</City>
    <City>Carson City</City>
    <City>Las Vegas</City>
  </Cities>
</State>
```

If a field in the JSONObject 11 is not valid, the valid data for that field should be retrieved. This is the content of the output of both validations: the valid data for the detected invalid field and the reason why the field is invalid. The valid data regarding the syntactic constraints are retrieved from the XSD parsing (3B), however the valid data regarding the semantic constraints requires a different approach to derive.

Figure 4:
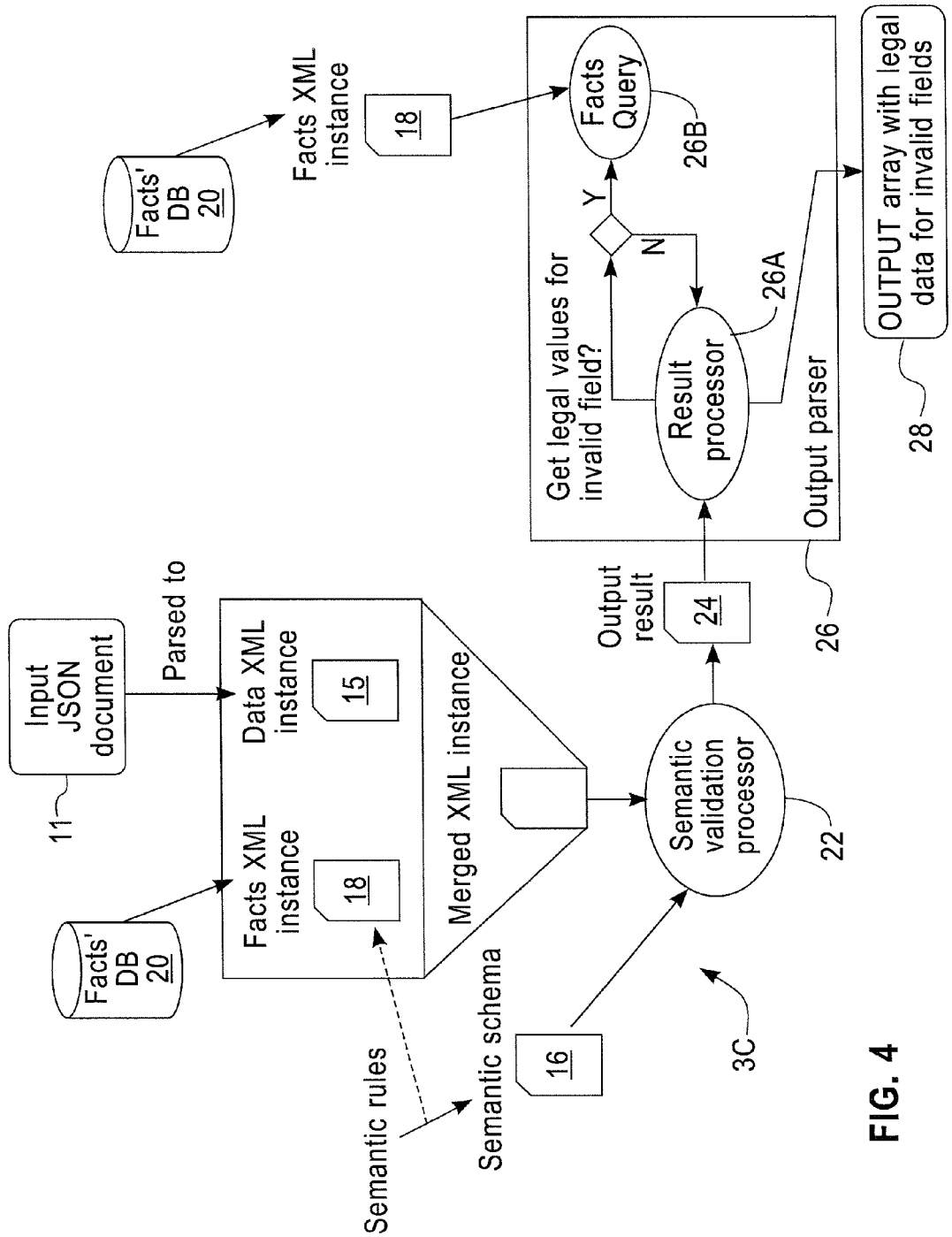
FIG. 4 shows in greater detail semantic constraints logic and how valid data is retrieved from semantic constraints.

FIG. 4 shows in greater detail the semantic constraints logic (Semantic Validation 3C in FIG. 3), and describes in detail how valid data is retrieved from the semantic constraints. Assume for example that the semantic constraints (validation) processor 22 is constructed using Schematron. The semantic schema is thus the Schematron schema 16, and by adding semantics in the message retrieved from the assert element one can specify XPath expressions that will be the output 24 of the semantics constraint processor 22 and that are used in an Output Parser 26, specifically by a Result processor 26A which will query 26B the Facts XML instance document 18. After processing the results 24 for all detected invalid fields that depend on others and containing XPath expressions to be executed, the output is an array 28 with the legal (valid) data for the invalid fields input specified in the Data XML instance 15.

As an example of the implementation using Schematron, consider following Table:
Rule: City Must be in the List of Cities of the Given State

```
<sch:rule context="UserDataValidation">
    <sch:assert test="count(/ValidationData/InputData/User/city)=0 or
    /ValidationData/InputData/User/city='' or
    count(/ValidationData/Facts/State[@value=
    /ValidationData/InputData/User/state]/Cities/city=/ValidationData/
InputData/User/city])=1">
city#required#dependency:state#//Facts/State[@value='<sch:value-of
select = "/ValidationData/InputData/User/state" />']/Cities/city
#City not in given state list.
    </sch:assert>
</sch:rule>
```

Schematron cannot process)(Path expressions in the Assert messages, only during test, in this case, here:

```
<sch:assert test="count(/ValidationData/InputData/User/city)=0 or
/ValidationData/InputData/User/city='' or
count(/ValidationData/Facts/State[@value=/ValidationData/InputData/
User/state]/Cities/city=/ValidationData/InputData/User/city])=1" >
```

This means: assert that if city was specified and is a non empty value, then the specified city must be in the state's cities list. If not so, Schematron will output the following message:

```
city#required#dependency:state#//Facts/State[@value='<sch:value-of
select="/ValidationData/InputData/User/state" />']/Cities/city
```

City not in given state list.
This must conform to the following:
<fieldName>*#<'required' or 'not required'>*#dependency: <field>#<XPath_expression>#<error message>
What this expression means is the following: the city field is required, depends on the state field and the)(Path expression for obtaining the valid data for the city field given the specified state.

The tags with * mean that they are always required to be specified, while the others (dependency, XPath expression and message) depend on the type of constraint.

Figure 5:
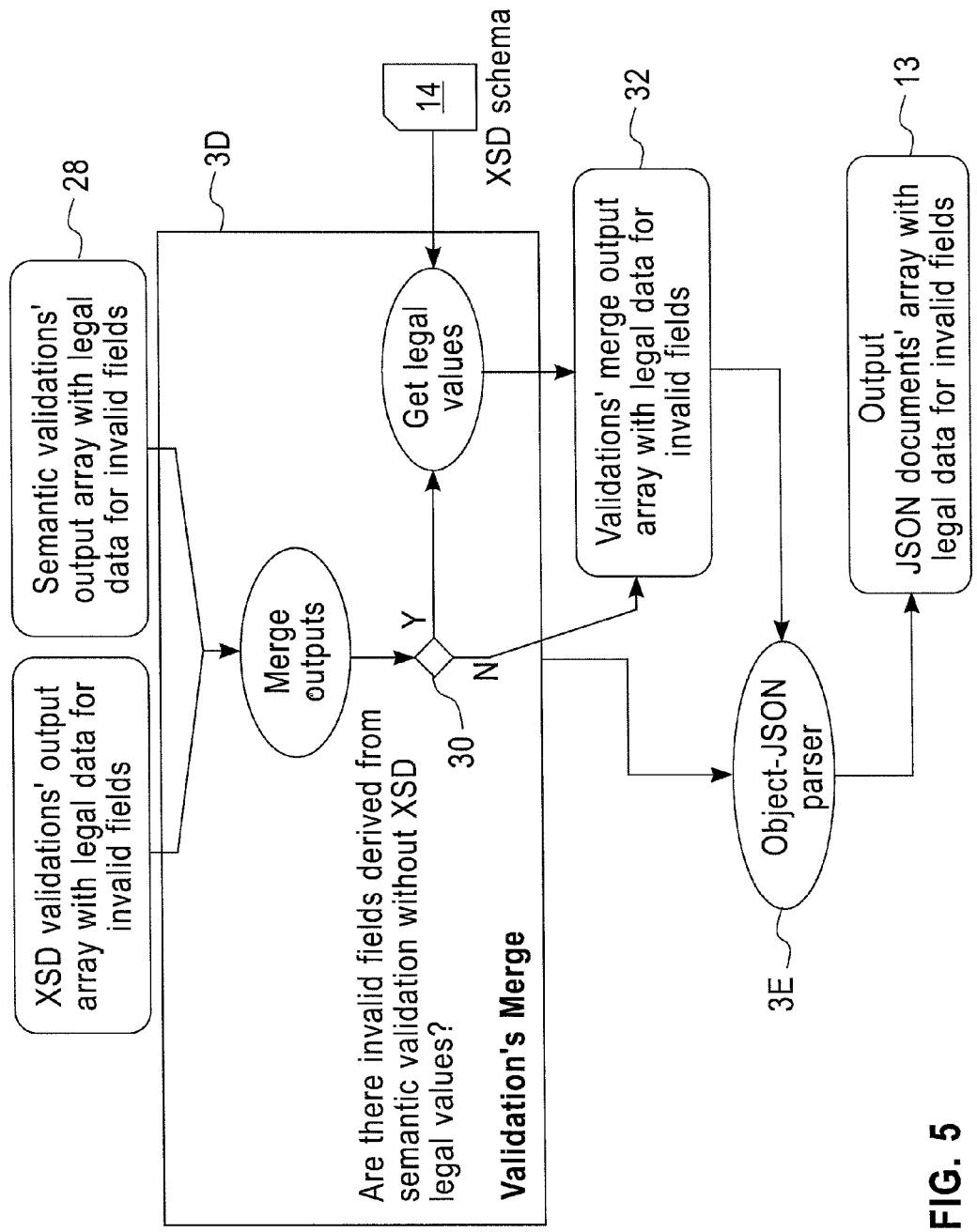
FIG. 5 shows a Validations merge function of FIG. 3 and the merging of results from syntactic and semantics functions of FIG. 3, and the gathering of complementary valid data from an XSD schema.

FIG. 5 shows the Validations merge function 3D of FIG. 3 and the merging of results from the syntactic and semantics functions 3B, 3C, and the gathering of complementary valid data from the XSD schema 14. That is, FIG. 5 shows how the array output with the valid data for the invalid fields detected through the semantic constraints logic 3C is merged with the array output of the syntactic constraints logic 3B. Note that it is possible that the XSD validation logic (syntactic) 3B does not detect an invalid field that the semantic validation logic 3C does detect. Therefore it is desirable to check if this has occurred (check logic 30) and, for each field in this case, to obtain the valid (legal) data with regard to the syntactic constraints (types and/or others) from the XSD Schema 14 with an XSD parser (block 32, validations merge output array with legal data for invalid fields). Finally, the merged array is parsed to JSON documents with Object-JSON parser 3E and returned to the Client application 10 (FIG. 1) or any application that requested the JSONObject validation.

Figure 6:
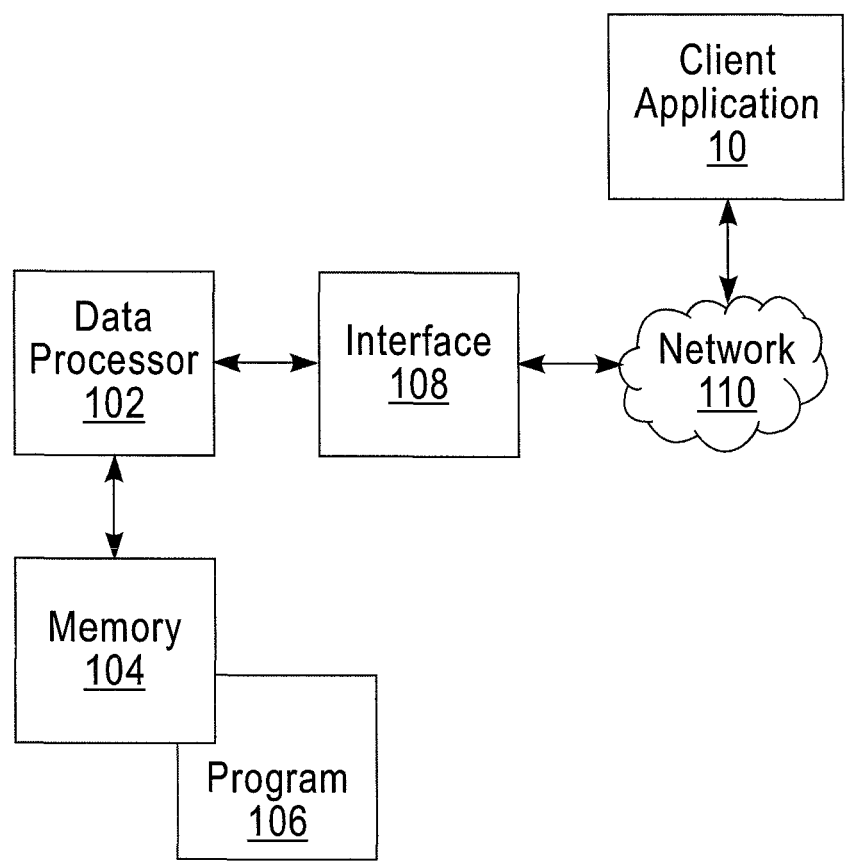
FIG. 6 shows an example of a computer system that can be used to implement the workflow of FIG. 3.

FIG. 6 shows an example of a computer system or data processing system 100 that can be used to implement the workflow of FIG. 3. As will also be described in further detail below, at least one computer or data processor 102 is connected with at least one computer readable medium such as a memory device or a memory system 104 that stores computer program instructions 106. Execution of the computer program instructions 106 results in the performance of methods and operations in accordance with this invention. The system 100 can be implemented as, for example, a personal computer-type device, as a workstation-type device or as a main frame type device. The at least one data processor 102 can be implemented in any suitable form including as one or microprocessors or microcontrollers. The memory device or system 104 can be implemented as one or more of, for example, solid state memory including dynamic RAM and/or static RAM, Flash memory, magnetic memory including disk and/or tape, or as optical memory. The computer program instructions 106 can be written in any suitable programming language and can be compiled prior to execution or executed by an interpreter. The system 100 includes at least one interface 108 that enables bidirectional communication with one or more external systems, memories and/or user terminals, such as the client application 10 shown in FIG. 1. The at least one interface 108 can be configured to interface to a network 110, such as one or both of a local area network (LAN) and a wide area network (WAN) such as the Internet, via wired or wireless communication paths.

Note that in some embodiments the workflow depicted in FIG. 3 may be contained in whole or in part in the system that hosts the client application 10 and, as such, the interface 108 may be an internal interface such as a local data bus for example.

Figure 7:
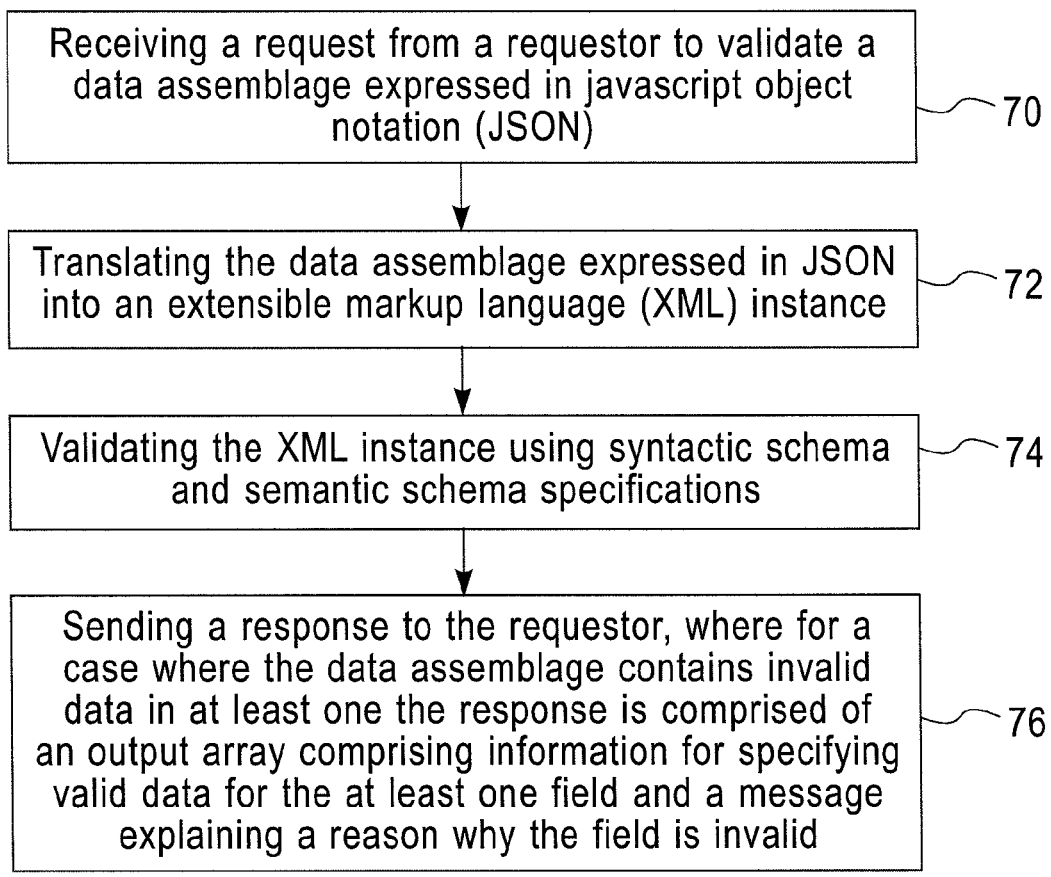
FIG. 7 is a logic flow diagram that is descriptive of a method of this invention, as well as the execution of computer program instructions shown in FIG. 6.

FIG. 7 is a logic flow diagram that is descriptive of a method of this invention, as well as the execution of the computer program instructions 106 shown in FIG. 6. At Block 70 there is a step of receiving a request from a requestor to validate a data assemblage expressed in Javascript Object Notation (JSON). At Block 72 there is a step of translating the data assemblage expressed in JSON into an extensible markup language (XML) instance. At Block 74 there is a step of validating the XML instance using syntactic schema and semantic schema specifications. At Block 76 there is a step of sending a response to the requestor, where for a case where the data assemblage contains invalid data in at least one field the response is comprised of an output array comprising information for specifying valid data for the at least one field and a message explaining a reason why the field is invalid.

As should be appreciated by one skilled in the art, aspects of the present invention may be embodied as a system, method, computer program product or as a combination of these. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document a computer readable storage medium may be any tangible, non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A method to process data, comprising:
   receiving a request from a requestor to validate a data assemblage expressed in Javascript Object Notation (JSON);
   translating with at least one data processor the data assemblage expressed in JSON into an extensible markup language (XML) instance;
   validating the XML instance using syntactic schema and semantic schema specifications; and
   sending a response to the requestor, where for a case where the data assemblage contains invalid data in at least one field the response is comprised of an output array comprising information for specifying valid data for the at least one field and a message explaining a reason why the field is invalid.

2. The method as in claim 1, where the output array is null in a case where the data assemblage does not include invalid data.

3. The method of claim 1, where the syntactic schema is specified using XML Schema (XSD).

4. The method of claim 1, where the semantic schema is specified using Schematron.

5. The method of claim 1, where validating comprises querying a facts database.

6. The method of claim 5, where an output of the facts database is expressed as a facts XML instance.

7. The method of claim 1, where the output array is formed by merging a result of semantic and syntactic validations to provide a merged result.

8. The method of claim 7, further comprising translating the merged result into a JSON document that expresses the array.

9. The method of claim 1, where validating determines if the input data assemblage conforms to an associated schema and is considered to be valid only if the input data assemblage satisfies the associated schema.

10. A computer program product embodied on a non-transitory computer-readable medium, where execution of the computer program product results in performance of the method as claimed in claim 1.

11. A computer-readable medium that contains computer program instructions, the execution of the computer program instructions by at least one data processor results in performance of operations that comprise:
   receiving a request from a requestor to validate a data assemblage expressed in Javascript Object Notation (JSON);
   translating the data assemblage expressed in JSON into an extensible markup language (XML) instance;
   validating the XML instance using syntactic schema and semantic schema specifications; and
   sending a response to the requestor, where for a case where the data assemblage contains invalid data in at least one field the response is comprised of an output array comprising information for specifying valid data for the at least one field and a message explaining a reason why the field is invalid.

12. The computer-readable medium as in claim 11, where the output array is null in a case where the data assemblage does not include invalid data.

13. The computer-readable medium as in claim 11, where the syntactic schema is specified using XML Schema (XSD).

14. The computer-readable medium as in claim 11, where the semantic schema is specified using Schematron.

15. The computer-readable medium as in claim 11, where the operation of validating comprises querying a facts database.

16. The computer-readable medium as in claim 15, where an output of the facts database is expressed as a facts XML instance.

17. The computer-readable medium as in claim 11, where the output array is formed by merging a result of semantic and syntactic validations to provide a merged result.

18. The computer-readable medium as in claim 17, further comprising translating the merged result into a JSON document that expresses the array.

19. The computer-readable medium as in claim 11, where the operation of validating determines if the input data assemblage conforms to an associated schema and is considered to be valid only if the input data assemblage satisfies the associated schema.

20. A data processing system, comprising:
   at least one data processor connected with at least one memory that stores computer program instructions;
   at least one interface connected with the at least one data processor and configured for conducting bidirectional communications via at least one network;
   said at least one data processor operating under control of the computer program instructions to receive a request via the interface from a requestor to validate a data assemblage expressed in Javascript Object Notation (JSON);
   said at least one data processor operating under control of the computer program instructions to translate the data assemblage expressed in JSON into an extensible markup language (XML) instance;
   said at least one data processor operating under control of the computer program instructions to validate the XML instance using syntactic schema and semantic schema specifications; and
   said at least one data processor further operating under control of the computer program instructions to send a response to the requestor via the interface, where for a case where the data assemblage contains invalid data in at least one field the response is comprised of an output array comprising information for specifying valid data for the at least one field and a message explaining a reason why the field is invalid.

21. The data processing system of claim 20, where the syntactic schema is specified using XML Schema (XSD), and where the semantic schema is specified using Schematron.

22. The data processing system of claim 20, where said data processor when validating queries a facts database, and where an output of the facts database is expressed as a facts XML instance.

23. The data processing system of claim 20, where the output array is formed by merging a result of semantic and syntactic validations to provide a merged result, and said at least one data processor operating under control of the computer program instructions is further configured to translate the merged result into a JSON document that expresses the array.

24. The data processing system of claim 20, where said at least one data processor operating under control of the computer program instructions when validating determines if the input data assemblage conforms to an associated schema, and where the input data assemblage is considered to be valid only if the input data assemblage satisfies the associated schema.

\* \* \* \* \*